United States Patent
Ameres et al.

(10) Patent No.: US 7,499,492 B1
(45) Date of Patent: Mar. 3, 2009

(54) VIDEO COMPRESSION AND ENCODING METHOD

(75) Inventors: Eric L Ameres, Cohoes, NY (US);
James Bankoski, Wynantskill, NY (US);
Adrian W Grange, Cambridgeshire (GB); Tim Murphy, New York, NY (US); Paul G. Wilkins, Cambridge (GB); Yaowu Xu, Clifton Park, NY (US)

(73) Assignee: On2 Technologies, Inc., New York ( * ) Notice: Subject to any disclaimer, the term of this patent is extended or adjusted under 35 U.S.C. 154(b) by 0 days.

(21) Appl. No.: 11/931,924

(22) Filed: Oct. 31, 2007

Related U.S. Application Data (63) Continuation of application No. 11/170,629, filed on Jun. 28, 2005.

(60) Provisional application No. 60/583,872, filed on Jun. 28, 2004.

(51) Int. Cl.
*H04N 7/12* (2006.01)
*H03M 7/00* (2006.01)

(52) U.S. Cl. .................................. 375/240.12; 341/65

(58) Field of Classification Search ............ 375/240.12, 375/240.01, 240.14, 240.16; 341/107, 65
See application file for complete search history.

(56) References Cited

U.S. PATENT DOCUMENTS

| | | | | |
|---|---|---|---|---|
| 6,765,964 | B1 * | 7/2004 | Conklin ................. | 375/240.14 |
| 7,170,937 | B2 * | 1/2007 | Zhou ..................... | 375/240.01 |
| 7,236,524 | B2 | 6/2007 | Sun et al. .............. | 375/240.12 |
| 2005/0147165 | A1 | 7/2005 | Yoo et al. .............. | 375/240.14 |
| 2005/0169374 | A1 | 8/2005 | Marpe et al. ........... | 375/240.16 |
| 2005/0265447 | A1 | 12/2005 | Park ...................... | 375/240.03 |

OTHER PUBLICATIONS

Wiegand et al., Overview of the H 264/AVC Video Coding Standard, Jul. 2003, IEEE Transactions on Circuits and Systems for Video Technology, vol. 13, No. 7, pp. 568, 569.

* cited by examiner

*Primary Examiner*—Gims S Philippe
(74) *Attorney, Agent, or Firm*—Levisohn Berger LLP (57) ABSTRACT

A method of compressing video data having at least one frame having at least one block and each block having an array of pixels is provided. The method transforms the pixels of each block into coefficients and creates an optimal transmission order of the coefficients. The method also optimizes the speed of processing compressed video data by partitioning the data bitstream and coding each partition independently. The method also predicts fractional pixel motion by selecting an interpolation method for each given plurality or block of pixels depending upon at least one metric related to each given block and varies the method from block to block. The method also enhances error recovery for a current frame using a frame prior to the frame immediately before the current frame as the only reference frame for lessening quality loss during data transmission. Enhanced motion vector coding is also provided.

7 Claims, 5 Drawing Sheets

$$C \quad A_0 \quad A_1 \quad A_2 \quad A_3 \quad A_4$$

$$L_0 \quad X_{00} \quad X_{01} \quad X_{02} \quad X_{03}$$

$$L_1 \quad X_{10} \quad X_{11} \quad X_{12} \quad X_{13}$$

$$L_2 \quad X_{20} \quad X_{21} \quad X_{22} \quad X_{23}$$

$$L_3 \quad X_{30} \quad X_{31} \quad X_{32} \quad X_{33}$$

| A | A | A | B |
|---|---|---|---|
| A | C | B | B |
| A | A | B | B |
| A | B | B | B |

1

| A | A | A | A |
|---|---|---|---|
| A | A | A | A |
| A | A | B | B |
| B | B | B | B |

2

| A | A | A | A |
|---|---|---|---|
| A | B | A | A |
| B | B | B | C |
| B | B | B | D |

3

| A | A | A | A |
|---|---|---|---|
| A | A | A | A |
| A | A | A | A |
| A | A | A | A |

STEP 1: CALCULATE AVERAGE PIXEL INTENSITY

| 0 | 6 | 16 | 16 |
|---|---|----|----|
| 0 | 6 | 9  | 16 |
| 2 | 4 | 9  | 16 |
| 0 | 5 | 9  | 16 |

SAMPLE AVERAGE PIXEL INTENSITIES

STEP 2: ASSIGN FIRST BLOCK LABEL A

| A | 6 | 16 | 16 |
|---|---|----|----|
| 0 | 6 | 9  | 16 |
| 2 | 4 | 9  | 16 |
| 0 | 5 | 9  | 16 |

SAMPLE AVERAGE PIXEL INTENSITIES

STEP 3: GO THROUGH THE REMAINING BLOCKS IN RASTER ORDER

STEP 4: REAPPLY WITH DIFFERENT THRESHOLDS:

| A | B | C | C |
|---|---|---|---|
| A | B | D | C |
| A | B | D | C |
| A | B | D | C |

SAMPLE LABELINGS THRESHOLD OF 2

| A | B | C | C |
|---|---|---|---|
| A | B | B | C |
| A | A | B | C |
| A | A | B | C |

SAMPLE LABELINGS THRESHOLD OF 4

| A | A | B | B |
|---|---|---|---|
| A | A | A | B |
| A | A | A | B |
| A | A | A | B |

SAMPLE LABELINGS THRESHOLD OF 15

| A | A | A | A |
|---|---|---|---|
| A | A | A | A |
| A | A | A | A |
| A | A | A | A |

SAMPLE LABELINGS THRESHOLD OF 15

*FIG. 2*

PREFERRED BIN WEIGHTINGS FOR BLOCK X

| 1 | 1 | 2 | 1 | 1 |
|---|---|---|---|---|
| 1 | 2 | 8 | 2 | 1 |
| 2 | 8 | X |   |   |

FIG. 3

CALCULATING THE TALLIES FOR BLOCK X

| 11 | 8 | 5 | 9 | 12 |
|----|---|---|---|----|
| 7  | 3 | 1 | 4 | 10 |
| 6  | 2 | X |   |    |

FIG. 4

|     | $A_0$    | $A_1$    | $A_2$    | $A_3$    | $A_4$ |
|-----|----------|----------|----------|----------|-------|
| $C$ |          |          |          |          |       |
| $L_0$ | $X_{00}$ | $X_{01}$ | $X_{02}$ | $X_{03}$ |       |
| $L_1$ | $X_{10}$ | $X_{11}$ | $X_{12}$ | $X_{13}$ |       |
| $L_2$ | $X_{20}$ | $X_{21}$ | $X_{22}$ | $X_{23}$ |       |
| $L_3$ | $X_{30}$ | $X_{31}$ | $X_{32}$ | $X_{33}$ |       |

VIDEO COMPRESSION AND ENCODING METHOD

BACKGROUND OF THE INVENTION

1. Field of the Invention

The invention relates to video compression and encoding methods, and more specifically to video compression methods that employ techniques to increase efficiency, compactability, and transmission of digital image and video data.

2. Description of Related Art

Digital pictorial information, whether derived from an analogue source by a process of digitization or directly from a digital device, consists of huge volumes of data. As the ability of devices to capture higher resolution images improves so too does the amount of data required for their digital representation If stored in raw format a single image may well require tens of mega-bytes of disk space.

The problem is further exacerbated when considering digital video data, especially for high definition video. A two-hour movie when stored in raw form at the highest resolution ATSC frame size (1920×1080 pixels at 30 frames per second) requires almost 641 Gbyte of disk space. At a data rate of almost 89 Mbyte/s the bandwidth required for transmission goes way beyond what is currently available.

The encoding operation may be considered to be a three-stage process. First, a block predictor, created from data already available to the decoder, is subtracted from the original data to form a prediction error signal. Second, the prediction error is block transformed and quantized. Finally, the transform coefficients are entropy coded to form a binary bitstream that constitutes the compressed frame.

The prediction stage may involve spatial or temporal prediction for video. For image compression, with no available temporal data, the only prediction mode available is spatial.

Many of the more successful algorithms have a two-dimensional block transform method at their core, partitioning each frame into rectangular blocks (usually 8×8 or 4×4) and applying the transform to each. Compression is achieved by coding the transform coefficients more efficiently than the original spatial data can be coded. The Discrete Cosine Transform (DCT) has received the most attention over the last thirty years or so, being the transform of choice in all of the MPEG video compression and the original JPEG image compression International Standards.

Another aspect of the invention covers the ability to reuse prior transmitted motion vectors, which may not appear directly adjacent to the current block, and to use statistics on these prior transmitted motion vectors to lessen the cost of encoding new motion vectors.

Motion fields tend to track real objects that move from one frame to the next. These objects typically cover more than the typical block size. There is usually reasonable consistency of motion vectors from one block to the next. Prior art makes use of this consistency by predicting a new motion vector from the motion vectors of the surrounding blocks and then encoding the difference between the real motion vector and the predicted motion vector. The prior art also uses a smaller subset of blocks in the prediction, typically four surrounding motion vectors (left, above left, above, and above right).

In the prior art, digital image/video compression systems use various techniques of prediction to reduce data redundancy. In block-based systems, to efficiently encode a block of pixels, a prediction block is constructed based on previously decoded data. That prediction block is subtracted from the source data and the residual signal is encoded using techniques such as transform coding. At the decoder the prediction block may be created from data that has already been decoded and the prediction error signal added back in to produce the reconstructed block.

The terms intra- and inter-prediction indicate that the prediction block is formed from data from the same image/video frame and previously decoded frame(s), respectively.

Sub Pixel motion estimation is used to build a prediction of a block that has moved from one frame to the next by something other than a whole pixel value. In sub-pixel motion estimation, the system attempts to estimate what would have happened to the block if the real object moved by a non-integral amount.

The prior art used a fixed set of interpolating filters to predict ½, ¼ and even ⅛ pixel moves. The problem with this technique is two fold: the longer the filter is the more likely you are to reproduce an image artifact and two shorter filters perform a less accurate interpolation and thus tend to blur real image detail.

The prior art, including some standards based codecs such as H 264, describes the use of various types of filters for smoothing the discontinuities that arise between blocks coded using discrete cosine transforms (DCT) or other similar block based transforms.

The problem with conventional loop filters is that they typically either fail to adequately remove false block discontinuities or over smooth the reconstructed image and hence suppress real image detail.

This invention relates to an improved method for loop filtering that includes adaptive techniques that maximize the beneficial effects of the filter and minimize the artifacts.

SUMMARY OF THE INVENTION

This invention covers a novel approach to encoding motion vectors that makes use of motion vectors from surrounding blocks in a way that differs from prior art. The current invention is based on the premise that a better prediction can be found by performing a motion search on multiple subdivisions of the same set of pixels. These subdivisions can be selected from a dictionary of subdivisions or derived from a set of 'subdividing' functions.

The current invention may be integrated into any image or video compression algorithm that involves a block transform.

For purpose of the current invention the term image refers to a rectangular array that contains either raw pixel values or prediction error values.

Before the block transform is applied a process is carried out to sub-divide the image into a set of fixed partitions (for instance 16×16 blocks of pixels). Then these fixed partitions are subdivided in multiple ways using either a fixed set of subdivisions or a set of functions that produce an arbitrary set of subdivisions. A motion search is performed on each of the subdivisions and the best subdivision in a rate distortion sense is selected. The best subdivision can either be directly encoded in the bitstream or it can be signaled through transmitted motion vectors on a more atomic subdivision level.

The benefit to an encoding in which the modes and motion vectors are encoded on an atomic level is that arbitrary patterns of motion vectors can be encoded efficiently.

Generally, an aspect of the invention includes a method for determining motion vectors during video compression. Multiple subdivisions are performed on an image or part of an image, and motion estimation is performed on each of segment of every subdivision. It is determined which of the subdivisions is the best using a metric, and a statistics based lossless coding technique is used to encode the motion vectors generated by the compression process.

Preferably, the subdivisions are provided from a set of labeling functions, which subdivide the image using criteria that differs from other labeling functions in the set.

Subdivision functions are preferably based on one or more of the following functions:

a. Blocks with variances within a certain threshold are given the same label
b. Blocks with average pixel intensities within a given threshold are given the same label
c. Blocks with error scores within a certain threshold are given the same label.

In addition or in the alternative, a specific dictionary of predefined subdivisions may be used.

The metric used to choose between the different subdivisions is preferably a combination of at least one of the following: rate distortion, sum squared prediction error, or sum absolute difference error score.

The invention also includes a method for encoding motion vectors. An image or part of an image is broken up into a set of smaller partitions. For each partition, a mode is encoded which includes the following: left motion vector, above motion vector, zero motion vector, and/or new motion vector. For each partition whose mode was new, motion vector encode a motion vector into the bitstream This invention also presents a new set of methods for intra-prediction in image and video compression, which include the "TrueMotion" intra-prediction mode, the "Left Predictor" intra-prediction mode, the "Above Predictor" intra-prediction mode, context based intra-prediction mode encoding, cost biased intra-prediction mode selection, and frame adaptive intra-prediction mode entropy encoding.

The current invention also uses the known technique of motion compensation to build a predictor for each inter coded block in the frame via sub-pixel motion. As mentioned above, prior art compression techniques use a fixed set of interpolating filters to predict ½, ¼, and ⅛ pixel moves. The problem with this technique is two-fold: the longer the filter is the more likely you are to reproduce an image artifact, and two shorter filters perform a less accurate interpolation and thus tend to blur real image detail.

This invention solves these problems by performing adaptive pixel analysis on the prediction filter and by picking between a set of filters that have different lengths. Shorter pixel filters are chosen when the results are less likely to be damaging. Longer filters are chosen when the clarity of the reconstructed frame is more important.

In another aspect of the invention, as mentioned above, the prior art predicts a new motion vector from the motion vectors of the surrounding blocks and then encoding the difference between the real motion vector and the predicted motion vector. The prior art also uses a smaller subset of blocks in the prediction. Typically four surrounding motion vectors: left, above left, above, and above right.

By contrast, the inventive method improves upon prior art by not just predicting the motion vector, but also by using statistics generated in the examination of the motion vectors of surrounding pixels as contextual information for encoding the motion vectors.

Specifically, the invention includes a method for encoding motion vectors of images in block based video compression algorithms, comprising the steps of:

i) Subdividing each image into a set of fixed partitions;

ii) Further subdividing each partition into segments according to a plurality of alternative subdivisions, each segment comprising one or more blocks of pixels;

iii) Selecting an optimal motion vector for each segment in each alternative subdivision based on an error score for each segment;

iv) Calculating a combined error score for each alternative subdivision equal to the sum of the error scores for each segment of the subdivision;

v) Selecting the subdivision with the lowest combined error score and encoding the motion vectors that were selected for the selected subdivision in step iv) into the bitstream.

Preferably, the optimal motion vector selection step iii) of a current partition uses motion vectors selected from a previously encoded partition. The combined error score calculating step iv) of a current partition preferably uses error scores calculated from a previously encoded partition. The subdivision selecting step v) of a current partition may use the subdivision selected from a previously encoded partition. The plurality of alternative subdivisions may be a fixed set of subdivisions, or a set of subdivisions derived from labeling functions, or both a first set of fixed subdivisions and a second set of subdivisions that are derived from labeling functions. The set of labeling functions includes at least one of the following: grouping blocks into segments according to variance; or grouping blocks into segments according to average pixel intensity; or grouping blocks into segments according to error score. Multiple subdivisions may be created using each labeling function of different thresholds.

The motion vector selecting step iii) may further include at least one of the following steps: performing a motion search for each block or segment and encoding the resulting new motion vectors; or using the same motion vector as the block or segment to the left of the current block or segment; or using the same motion vector as the block or segment above the current block or segment; or using a zero motion vector (0,0); or using a previously encoded motion vector from a block or segment that is not immediately adjacent to the current block or segment.

The error score basis for selecting the motion vector in step iii) may include a rate distortion calculation, or alternatively a prediction error calculated either as the sum squared error or the sum of absolute differences.

In another aspect of the invention, a method for encoding motion vectors in video compression is provided, including the steps of:

Subdividing each image into a set of fixed partitions, and for a given partition:

a) Examining the surrounding partitions' motion vectors in an order based on the proximity to the given partition;

b) Counting how many times each motion vector appears in the surrounding partitions;

c) Using a subset of these counts for one or more of the following:

i) Determining which motion vector is re-used as a reference; or
ii) As context for losslessly encoding which motion vector is re-used as a reference; or
iii) As context for losslessly encoding a new motion vector The counts from step b) may be distance weighted. Optionally, this method may further include:

Creating an N dimensional array as the lossless encoding context of c) ii) where N is the number of different motion vectors used in neighboring partitions; and Using the count of each different motion vector to index each dimension of the array, Wherein the value stored in the array is a set of probabilities that determine which motion vector to use as reference.

Optionally, a function on the counts from step b) may be used to determine a set of probabilities that determine the motion vector to use as a reference.

In another aspect of the invention, a method of encoding video and or image data is provided having the steps of
  a) Subdividing each image into a set of fixed partitions;
  b) Giving each pixel in the partition a predicted value using any one or more of the following equations:

$X_{ij}=L_i+A_j-C;$ $X_{ij}=(Li_{-1}+2L_{i+1}L_{i+1}+2)/4;$ $X_{ij}=(Aj_{-1}+2A_j+A_{j+1}+2)/4;$

Where i and j represent the row and column position of $X_{ij}$ within a partition, $L_i$ is the pixel from the column left to the partition in the same row of $X_{ij}$, $A_j$ is the pixel from the row above but in the same column of $X_{ij}$, C is the pixel on the intersection of the row above and the column left to the partition,
  c) Subtracting the predicted values from the source pixel values;
  d) Quantizing and transforming the resultant value from step c) using a transform function into transform coefficients; and
  e) Losslessly encoding the transform coefficients of step d) into the bitstream In another aspect of the invention, a method for intra prediction for use in block based video compression/decompression algorithms is provided having the following steps:

Subdividing each image into a set of fixed partitions;
  Provisionally encoding each partition using a plurality of different prediction modes in which pixels in the current partition are predicted by previously decoded pixels within the same image from the row above and the column to the left of the current partition, said provisional encoding done by giving each pixel in the partition a predicted value using at least one of the following equations:

$X_{ij}=L_i+A_j-C;$ or $X_{ij}=(Li_{-1}+2L_i+L_{i+1}+2)/4;$ or $X_{ij}=(Aj_{-1}+2A_j+A_{j+1}+2)/4;$

Selecting the optimal mode using either a true rate distortion metric or a combination of a prediction error metric and a factor or function relating changes in bit cost or estimated bit cost for encoding the partition to changes in prediction error;
  Encoding the selected optimal mode and transmitting the selected optimal mode within the bitstream, and encoding the partition in accordance with the selected optimal mode,
  Wherein the selected optimal mode is encoded using a conditional probability distribution indexed or otherwise accessed according to the prediction modes of the previously encoded partitions above and to the left of the current partition.

Optionally, the provisional encoding step entails using any two or more of the specified equations. Optionally, the conditional probability distribution is defined by a table of constants.

The probability distribution may be updated on a per frame basis according to statistics gathered relating to the frequencies or conditional frequencies of each mode in at least one prior frame. The probability distribution may be a fixed baseline distribution. As another alternative, the probability distribution is updated for an image only when the number of bits used to update the probability distribution plus the number of bits required to encode all the prediction modes within the image using the updated probability distribution is less than the number of bits required to encode all the prediction modes using either the baseline probability distribution or the unchanged probability distribution from the previous frame.

The decision of intra prediction mode for a partition may be based on a metric that combines the cost of the modes with error scores of the modes, where the cost of an intra prediction mode of a partition is calculated using Shannon cost of each mode calculated by the conditional probability distribution of the intra prediction modes for the partition and the error score of the mode is calculated using the differences between the predicted pixels values and the actual pixel values for the partition.

Optionally, the following steps may be included: multiplying the cost of each mode with a constant; adding the multiplied cost of each mode to the error score for the mode; and selecting the intra prediction mode with lowest combined score for the partition.

In another aspect of the invention, a method for inter prediction of blocks of pixels using motion vectors in a video compression algorithm is provided, having the following steps:

Specifying the location of a block in a previously decoded reference frame to be used as predictor, relative to the spatial position of the block being predicted, by a two-dimensional motion vector;
  Specifying the motion vector to ½ or ¼ pixel precision in the luma domain and ¼ or ⅛ pixel precision in U and V;
  Where a fractional pixel vector is used, deriving the predictor block by applying a 6-tap 2 dimensional interpolation filter, whose coefficients, when implemented as a separable 2-dimensional filter such that the prediction block is first filtered in one dimension (horizontal or vertical) and the resulting filtered data block is then filtered in the other dimension, are as follows:

| 2 | −11 | 108 | 36  | −8  | 1 | (¼ pixel) |
| 3 | −16 | 77  | 77  | −16 | 3 | (½ pixel) |
| 1 | −8  | 36  | 108 | −11 | 2 | (¾ pixel) |

In another aspect of the invention, a method for inter prediction of blocks of pixels using motion vectors in a video compression algorithm is provided, having the following steps:

Specifying the location of a block in a previously decoded reference frame to be used as predictor, relative to the spatial position of the block being predicted, by a two-dimensional motion vector;
  Specifying the motion vector to ½ or ¼ pixel precision in the luma domain and ¼ or ⅛ pixel precision in U and V;
  Where a fractional pixel vector is used, deriving the predictor block by applying of an interpolation filter selected from a plurality of possible filters according to the content of the data being filtered,
  Wherein the plurality of interpolation filters includes a 6-tap 2 dimensional interpolation fitter, whose coefficients, when implemented as a separable 2-dimensional filter such that the prediction block is first filtered in one dimension (horizontal or vertical) and the resulting filtered data block is then filtered in the other dimension, are as follows:

| | | | | | | |
|---|---|---|---|---|---|---|
| 2 | −11 | 108 | 36 | −8 | 1 | (¼ pixel) |
| 3 | −16 | 77 | 77 | −16 | 3 | (½ pixel) |
| 1 | −8 | 36 | 108 | −11 | 2 | (¾ pixel) |

In either of the immediately preceding embodiments, the filter is implemented using floating point or fixed point arithmetic, or the filter may not be implemented as a separable 2 dimensional filter. One of the filters that may optionally be selected may be a 2-tap bi-linear filter, a 4-tap bi-cubic filter, or a 6-tap filter. The basis for selecting between the pluralities of possible filters may be the magnitude of the sum of inter-pixel differences. The basis for selecting between the interpolation filters may include the following steps:

Defining a first sum of differences between horizontally neighboring pixels in a block;

Defining a second sum of differences between vertically neighboring pixels in a block;

If the first sum of differences is less than a first threshold, selecting the bi-linear filter;

If the first sum of differences is greater than the first threshold but less than a second threshold, selecting the bi-cubic filter;

If the first sum of differences is greater than the second threshold but less than a third threshold, selecting the 6-tap filter;

If the second sum of differences is less than the first threshold, selecting the bi-linear filter;

If the second sum of differences is greater than the first threshold but less than the second threshold, selecting the bi-cubic filter;

If the second sum of differences is greater than the second threshold but less than the third threshold, selecting the 6-tap filter, Wherein the first, second, and third thresholds may either be derived by the encoder and the values coded in the bitstream, or have fixed values known to both encoder and decoder.

DESCRIPTION OF THE PREFERRED EMBODIMENTS

Figure 1:
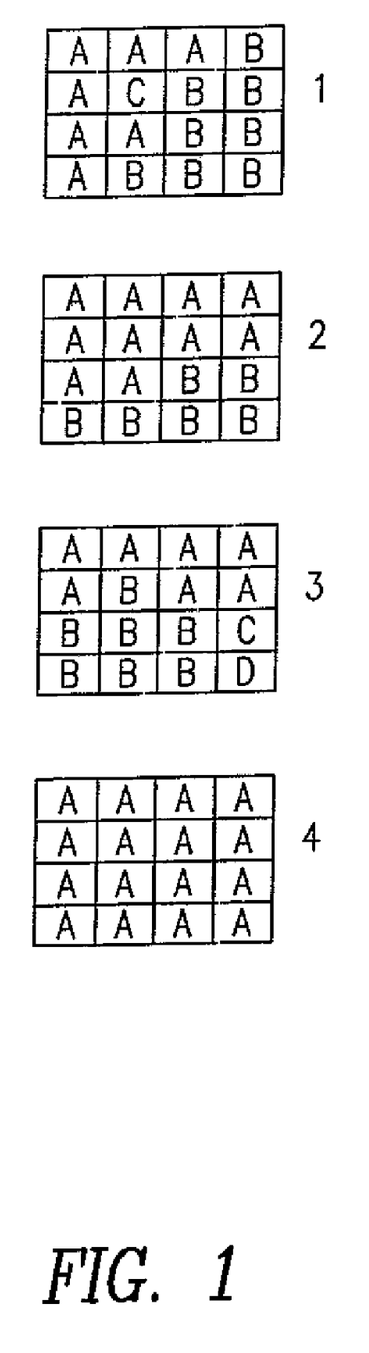
FIG. 1 is a schematic of an example set of 16×16 block subdivisions.

Description will now be given of the invention with reference to the attached FIGS. 1-7. It should be understood that these figures are exemplary in nature and in no way serve to limit the scope of the invention, which is defined by the claims appearing herein below Motion Modes and Masked Motion Compression FIG. 1 is an example set of 16×16 block subdivisions. Each letter in the blocks represents a 4×4 set of pixels within a 16 by 16 block of pixels The invention is accomplished using the logic demonstrated with the following pseudo-code.

Psuedo-Code for Selecting Motion Vectors Table 1

Determine a set of subdivisions to test

For each sub-division

For each labeled segment within a subdivision

Calculate the rate-distortion value (see Table II) for each of the following:

1) Use the MV (motion vector) from segment left

1) Use the MV from segment above

2) Use no MV

Set segment mv to the mv from above that gives you the lowest rate distortion value If that rate distortion value is above a preset threshold Find the best motion vector for the current labeled segment Calculate the rate distortion value for that segment If that value <less than current segment rate distortion value Set segment mv to best mv Add the current segment's rate distortion value to the current subdivision's rate distortion value If the current subdivision's rate distortion value is less than the best subdivision's rate distortion value yet seen Record each of the subdivision's best segment MVs Determining a Segment's Rate Distortion Value Table II Segment Rate Distortion Value = 0

For each block within a segment

Rate=
  # bits to encode mode (left, above, zero, or new MV)+
  + # bits to encode motion vector (only for new motion vector)+
  + # bits to encode residual error signal the block)

Block Distortion = sum squared error for each pixel within the block

Block Rate Distortion Value =
  Rate * Rate Factor + Distortion * Distortion Factor Segment Rate Distortion Value =
  Segment Rate Distortion Value + Block Rate Distortion Value Encoding the Modes Table III For each block within each partition If MV of the current block is the same as the mv of the left block encode "left"

Else if MV of the current block is the same as the mv of the above block encode "above"

Else if the MV of the current block is (0,0) encode "zero"

Else encode "new motion vector"

This invention also covers the use of special labeling functions to create an arbitrary set of subdivisions. The goal in the design of these functions is to produce segments of different size and shape; the hope is that one of these segments will best match the moving objects on the screen and thus produce a better prediction for the current block. The current embodiment of this invention specifies a set of possible functions for use as follows:

1. Blocks with variances within a certain threshold are given the same label
2. Blocks with average pixel intensities within a given threshold are given the same label
3. Blocks with error scores within a certain threshold are given the same label.

Figure 2:
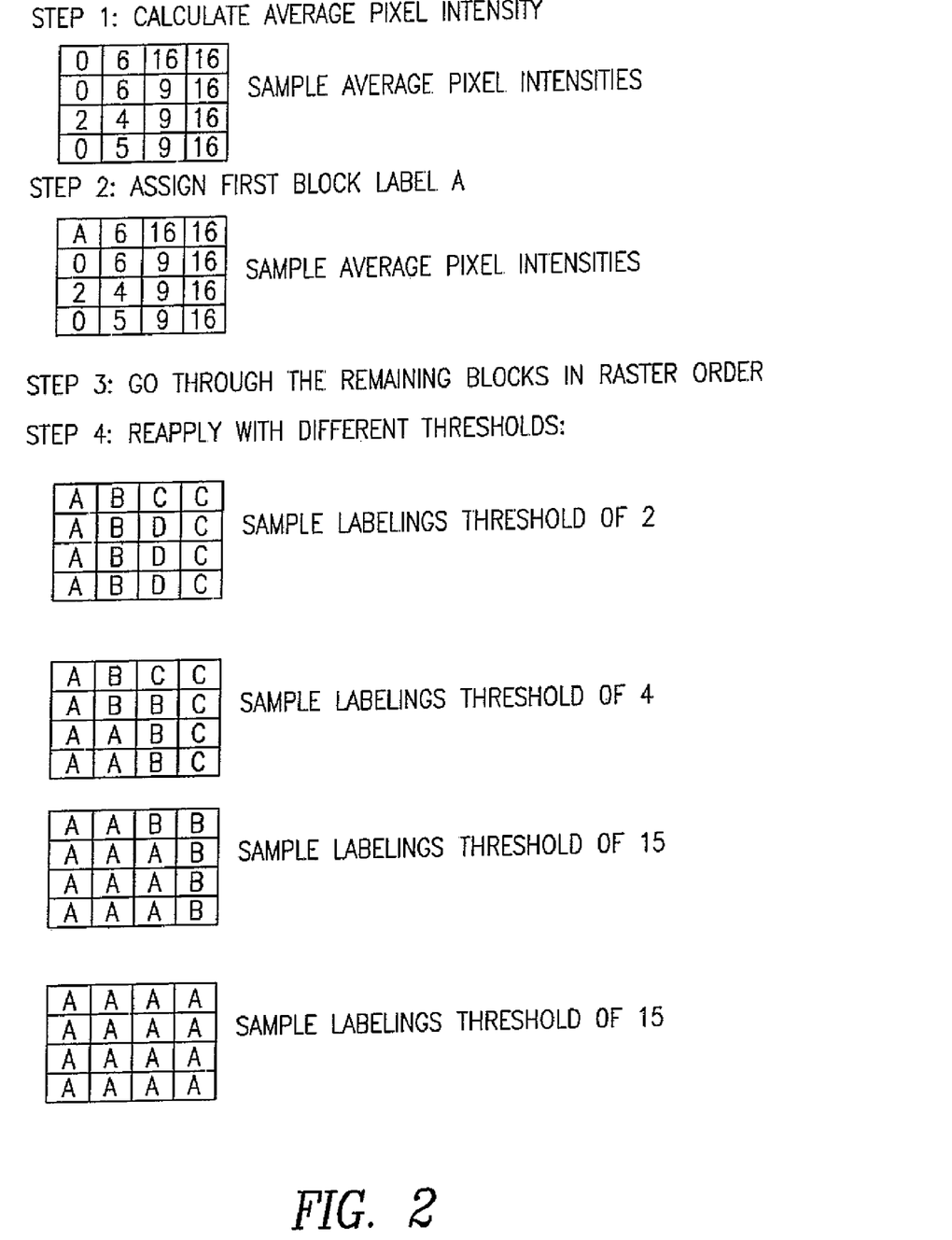
FIG. 2 is a diagram showing the step-by-step generation of subdivisions.

The invention also covers a method for generating different subdivisions that includes picking one of the above functions and applying it multiple times with a different threshold for each desired subdivision This method is illustrated in FIG. 2

The thresholds can be selected dynamically to best insure that different labeling is set up Step 1—Calculate average pixel intensity
Step 2—Assign first block label A
Step 3—GO through the remaining blocks in raster order as follows:
If difference between current and left block is less than threshold & also less than or equal to the difference between the current and above block
  Assign the block the same label as the left block
Else if difference between current block and the above block<threshold
  Assign the block the same label as the above block
Else
  Assign the block the next labeled value
Step 4 Reapply with different thresholds (e.g., sample labeling thresholds of 2, 4, 9, and 15 are shown in FIG. 2).

Another aspect of the invention covers the ability to reuse prior transmitted motion vectors, which may not appear directly adjacent to the current block, and to use statistics on these prior transmitted motion vectors to lessen the cost of encoding new motion vectors.

Motion fields tend to track real objects that move from one frame to the next. These objects typically cover more than the typical block size. There is reasonable consistency of motion vectors from one block to the next Prior art makes use of this consistency by predicting a new motion vector from the motion vectors of the surrounding blocks and then encoding the difference between the real motion vector and the predicted motion vector.

This invention covers a novel approach to encoding motion vectors that makes use of motion vectors from surrounding blocks in a way that differs from prior art Surrounding blocks are tallied into 4 different bins;
Bin 1 is used to tally blocks with no motion vector
Bin 2 is used to tally blocks in which the nearest motion vector appears
Bin 3 tallies blocks in which the next closest motion vector appears
Bin 4 tallies blocks that can't fit into any of the other bins.

Figure 3:
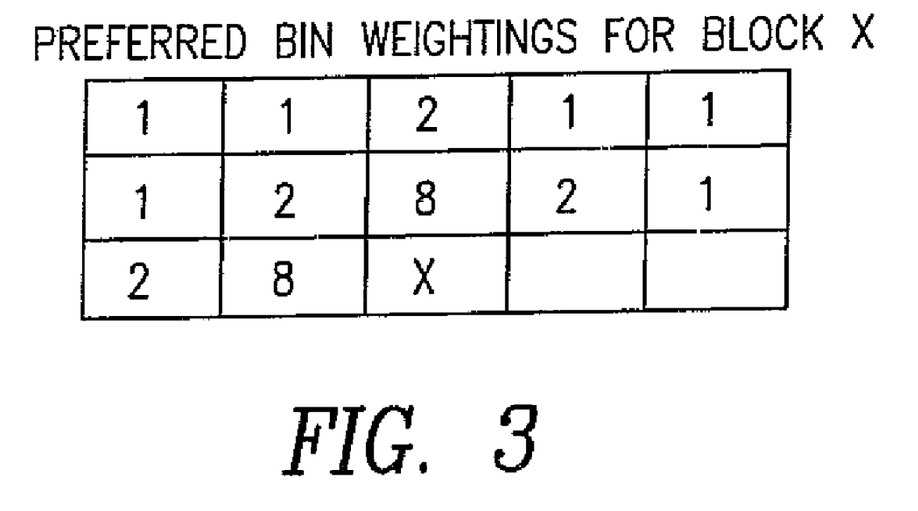
FIG. 3 is a diagram showing the preferred bin weightings for block X

In the preferred embodiment the block tally is weighted by the block's closeness to the block whose motion vector is being encoded (see FIG. 3).

Set nearestMv to 0,0
  Set nearMv to 0,0
  For each block = 1 to 12
  If mv[block]! = 0,0
  nearestMv = mv[block]
  Bin[2] += binWeighting[block]
  Break;
  Else
  Bin[1] += binWeighting[block]
For each block = block to 12
  If mv[block] == 0,0
  Bin[1] += binWeighting[block]
  Else if mv[block]==nearestMV
  Bin[2]+=binWeighting[block]
  Else
  NearMV = mv[block]
  Bin[3]+=binWeighting[block]
  Break For each block = block to 12
  If mv[block] == 0,0
  Bin[1] += binWeighting[block]
  Else if mv[block] == nearestMV
  Bin[2] += binWeighting[block]
  Else if mv[block] == nearMV
  Bin[3] += binWeighting[block]
Else
  Bin[4] += binWeighting[block]

These counts in each bin are used in a number of different ways:
1) A mode is encoded which can be one of the following:
   a. No motion vector
   b. Nearest motion vector
   c. Next Nearest Motion Vector
   d. New Motion Vector
   e. Subdivided Motion Vector The mode refers to what motion vector is used for the block.
2) The context used to encode this mode is the counts associated with the 4 bins (see
   USING BIN COUNTS TO ENRTOPY ENCODE MODES TABLE IV
3) The motion vector associated with the bin with the highest count is used as a prediction for a new motion vector if the mode is new motion vector (If the bin is bin 4 then the predicted motion vector is 0,0)

Using Bin Counts to Enrtopy Encode Modes Table IV

Figure 4:
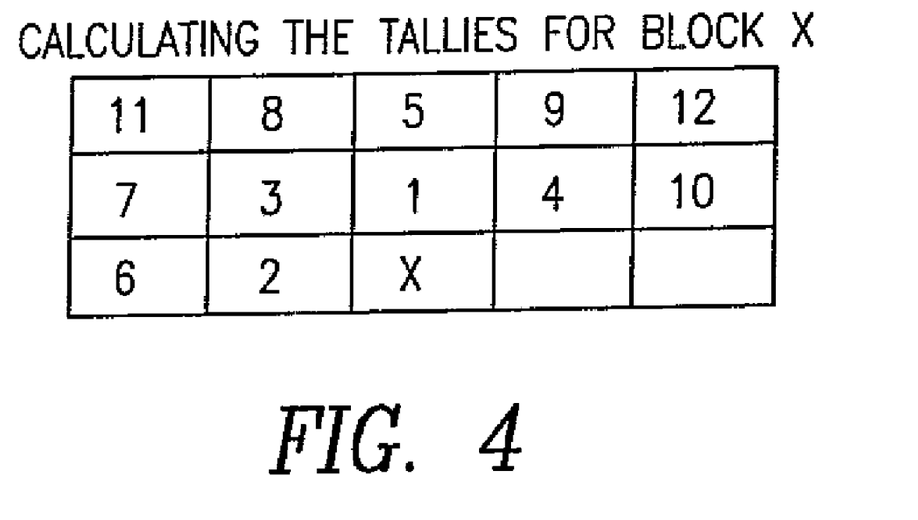
FIG. 4 is a diagram showing calculations of tallies for block X.

A. Calculate Probability of Nearest MV mode Given Bin 1 is the size it is(see FIG. 4)

B. If Mode is Nearest MV

C. Shannon Encode a 1 with probability given from step A

D. Else

E. Shannon Encode a 0 with probability given from step A

F. Calculate Probability of Zero MV mode Given Bin 0 is the size it is (see FIG. 4)

G. If Mode is Zero MV

H. Shannon Encode a 1 with probability given from step F

I. Else

J. Shannon Encode a 0 with probability given from step F

K. Calculate Probability of Near MV mode Given what Bin 2 is (see FIG. 4)

L. If Mode is near MV

M. Shannon Encode a 1 with probability given from step K

N. Else

O. Shannon Encode a 0 with probability given from step K

P. Calculate Probability of New MV mode Given what Bin 3 is (see FIG. 4)

Q. If Mode is new MV

R. Shannon Encode a 1 with probability given from step P

S. Else

T. Shannon Encode a 0 with probability given from step P

The probabilities can either be given by a straight function an example follows:

Probability = BinCount[1]/30.0

Or the value to use can be calculated via a lookup table

Probability = P[BinCount[1]]

Intra-Prediction

The current invention defines a set of block predictors that use data from one or more previously decoded blocks to produce the closest approximation to data in the block that is being predicted.

In the preferred embodiment various block sizes are used, but the invention may be applied to blocks of arbitrary size which may include, but is not limited to, the set 16×16, 8×16,16×8, 8×8, 8×4, 4×8 and 4×4. For the purposes of description of the various prediction modes we consider the case where the block size is 4×4. The methods presented may easily be extended to arbitrary block sizes without loss of generality.

Figure 5:
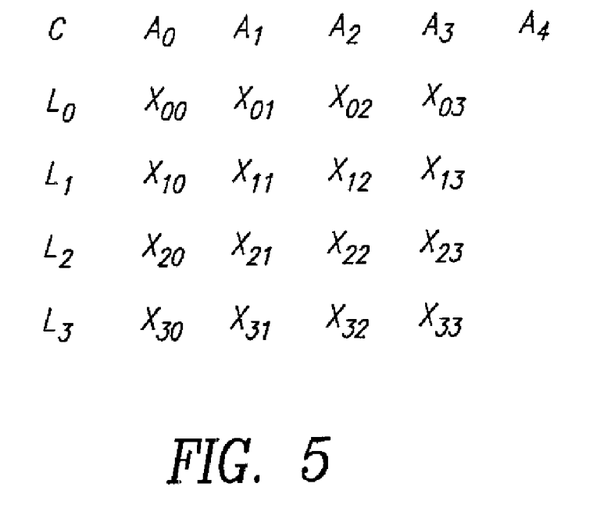
FIG. 5 is a diagram showing the relative position of previously coded pixels C, Ai, and $L_j$ and the block being predicted $X_{ij}$ in the image/frame.

FIG. 5 shows the relative position of the pixels in previously decoded blocks and those of the block that have to be predicted. In the sections that follow reference should be made to this figure.

|   | $A_0$ | $A_1$ | $A_2$ | $A_3$ | $A_4$ |
|---|---|---|---|---|---|
| C |   |   |   |   |   |
| $L_0$ | $X_{00}$ | $X_{01}$ | $X_{02}$ | $X_{03}$ |   |
| $L_1$ | $X_{10}$ | $X_{11}$ | $X_{12}$ | $X_{13}$ |   |
| $L_2$ | $X_{20}$ | $X_{21}$ | $X_{22}$ | $X_{23}$ |   |
| $L_3$ | $X_{30}$ | $X_{31}$ | $X_{32}$ | $X_{33}$ |   |

FIG. 5 Relative positions of the previously decoded pixels C, Ai and $L_i$ and the block being predicted $X_{ij}$ in the image/frame.

The values $L_i$ refer to pixels in the block to the left of the current block, which is referred to as the "Left" block. Similarly, the values $A_i$ and C refer to pixels in the blocks above the current block, which is referred to as the "Above" block.

1 "TrueMotion" Intra-Prediction Mode

One prediction mode used in the current invention is defined by the following equation to calculate $X_{ij}$:

$$X_{ij} = L_i + A_j - C;$$

2. "Above Predictor" Intra-Prediction Mode

A further prediction mode, called the "Above Predictor", in the current invention is defined by the following equation to calculate $X_{ij}$:

$$X_{ij} = (Li_{-1} + 2L_i + L_{i+1} + 2)/4$$

It is essentially a weighted predictor based on previously decoded pixel values from the blocks directly above the block being predicted. As these values come from previously decoded blocks these values will be available at the decoder when required.

3. "Left Predictor" Intra-Prediction Mode

A further prediction mode, called the "Left Predictor", in the current invention is defined by the following equation:

$$X_{ij} = (Aj_{-1} + 2A_j + A_{j+1} + 2)/4$$

It is essentially a weighted predictor based on previously decoded pixel values from the block to the left of the block being predicted. As these values come from previously decoded blocks these values will be available at the decoder when required.

4. Context Based Intra-Prediction Mode Encoding

The current invention embodies a new context based encoding scheme for encoding intra-prediction mode decisions. This encoding method is used to encode an intra-prediction mode for a block in cases where both the left and above block are also coded using an intra-prediction mode.

Figure 6:
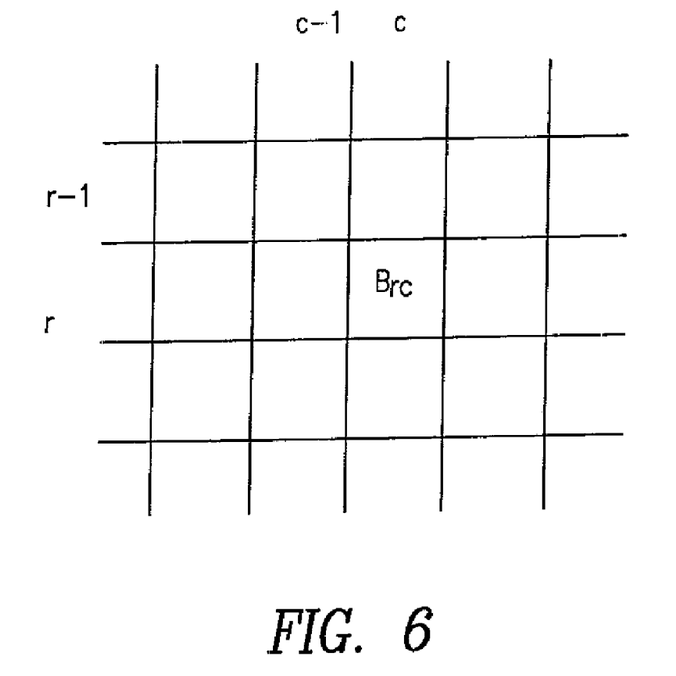
FIG. 6 is a diagram a number of blocks including block $B_{rc}$ of an image/video frame

As shown in FIG. 6, block $B_{rc}$ is located in the $r^{th}$ block row and the $c^{th}$ block column of the current image/video frame.

From experiments, the intra-prediction mode of block $B_{rc}$, $Mode_{rc}$, is found to be closely correlated to the intra-prediction modes of blocks and $B_{rc(1)_-}$ when intra-prediction is used for both $B_{(r-1)c}$ and $B_{r(c-1)}$.

In the current invention both the encoder and decoder maintain a conditional probability distribution of intra-prediction modes for a particular frame. The conditional probability model, or context, consists of the intra-prediction modes used to code the blocks immediately to the left of and above the current block:

$$Prob(MCURRENT|M_{LEFT}=m_{LEFT}, M_{ABOVE}=m_{ABOVE})$$

Where $M_{CURRENT}$ represents the intra-prediction mode of the current block, $M_{ABOVE}$ and $M_{LEFT}$ represent the modes of the two neighboring blocks and $m_{ABOVE}$ and $m_{LEFT}$ represent the actual mode used in the neighboring blocks.

In other words, for every possible combination of intra-prediction modes that the above and left blocks may use, a probability distribution is created for the set of possible values for the current block mode.

For a particular intra-predicted block the selected mode is then encoded into the bitstream as follows:

Find the intra-prediction mode for the current block, $Mode_{CURRENT}$

Determine the intra-prediction mode used by the left block, $Mode_{LEFT}$

Determine the intra-prediction mode used by the above block, $Mode_{ABOVE}$

Look-up the conditional probability for $Mode_{CURRENT}$ for the context ($Mode_{LEFT}$, $Mode_{ABOVE}$), $P(Mode_{CURRENT}|Mode_{LEFT}, Mode_{ABOVE})$ Use this probability to encode the mode decision using, for example, an arithmetic or Huffman coder.

In the preferred embodiment the above conditional probability distributions are used to encode each intra-prediction mode using an arithmetic encoder.

5, Cost Biased Intra-Prediction Mode Selection

The selection of a prediction mode to use for a particular block is commonly based solely on minimizing the prediction error as measured by some defined error metric Many such metrics have been used in the prior art examples being the sum of absolute differences, the sum of squared differences, and the variance.

The major problem with this method of selecting mode is that it does not consider the cost of encoding the prediction mode decision itself in to the bitstream, resulting in a possibly non-optimal solution. For example, if the mode that produces the smallest prediction error requires significantly more bits to encode in the bitstream than an alternative mode that has only a slightly larger prediction error, it may be better to use the alternative prediction mode to achieve a more optimal cost-compression trade-off.

To overcome this problem, the current invention embodies a cost biased strategy in selecting best overall intra-prediction mode for each intra-predicted block. The basic idea is to consider the overall encoding cost of each prediction mode, including both the signaling cost of the mode choice and the cost of coding the prediction error signal, and select the intra-prediction mode with best overall efficiency.

The current invention converts the cost of each prediction mode into a quantity that is added into the prediction error resulting from coding using that mode. The mode with the smallest aggregate error score is then selected. The decision process for each block involves the following steps:

a. Find the intra-prediction mode of the block above and the block to the left, $m_{ABOVE}$ and $m_{LEFT}$,
b. Find the probability distribution $P(Mode_{CURRENT}|Mode_{LEFT}, Mode_{ABOVE})$,
c. Use Shannon theory to convert the probability distribution to number of bits necessary to encode each prediction mode: $Bits_m$,
d. Calculate the error metric sum of squared differences for each prediction mode:
   Calculate $SSD(m)+Bits(m)*C$, where C is an empirical value that measures the amount of SSD per bit when the difference signal is encoded using transform coding C is dependent upon the quantizer level and is commonly referred to as a rate distortion metric.
e. The Intra-prediction mode resulting in the smallest value in step (e) is then chosen 6. Frame Adaptive Intra-Prediction Entropy Encoding The content of video changes from frame to frame, which means the probability distribution described in sections 4 and 5 could change accordingly. The actual probability distribution of each video frame provides the best coding efficiency for that frame.

However, any updating of such a distribution involves an overhead cost of transmitting the updates in the compressed bitstream. The current invention presents a method to determine when an update is appropriate.

The process proceeds as follows:
a) Remember the conditional mode probability distribution for the previous frame, or known baseline if no previous frame exists, $P_{PREVIOUS}$,
b) Count the number of times each mode is selected in the current frame to produce the conditional mode probability distribution for the current frame, $P_{CURRENT}$,
c) Encode all modes using the previous frame probability distribution, resulting in $B_{PREVIOUS}$ bits,
d) Encode all modes using the current frame probability distribution, resulting in $B_{CURRENT}$ bits,
e) Calculate the number of bits required to update the probability distribution from that used for the previous frame and that computed from the current frame, $B_{UPDATE}$,
f) If $(B_{CURRENT}+B_{UPDATE})<B_{PREVIOUS}$ then it is cost effective to transmit the update and use it to encode modes in the current frame. Otherwise, use the existing mode probability distribution.

Sub-Pixel Filtering

A two-dimensional motion vector specifies the location, relative to the spatial position of the block being predicted, of the block in a previously decoded reference frame to be used as predictor A decoded prediction error signal is subsequently added to the prediction block to create the final reconstructed block.

Motion vector components are specified to ¼ sample accuracy for luma blocks, the vector for the corresponding chroma blocks is derived from this. In the preferred embodiment the YUV 4:2:0 color space is used as the internal coding format In this format the distance between two chroma samples is twice that of the distance between luma samples Consequently, if the luma components of a motion vector are specified to ¼ sample accuracy, then the chroma components are at $⅛^{th}$ sample values.

To handle all cases a separate filter is specified for each of the eight $⅛^{th}$ sample positions, i.e. at positions {0, ⅛, ¼, ⅜, ½, ⅝, ¾, ⅞} between pixels. The first of these positions is, trivially, the position of the pixel value itself and requires no interpolation.

In order to generate the values at fractional locations between pixels, some form of interpolation process is applied. The preferred embodiment specifies an interpolation algorithm that employs a set of separable two-dimensional filters.

For each inter-coded luma block that has a non-zero motion vector, data from the reference frame at a location relative to the current block as specified by the non-fractional part of the motion vector is first filtered horizontally to produce the fractional horizontal position data. The resulting data is then filtered vertically to produce the required result Applying the vertical filter before the horizontal is equally valid, but may produce different results. In each case the particular filter used is determined by the fractional part of the motion vector component. For example, if the motion vector were (4½, ¾) then the horizontal and vertical filters corresponding to the ½ and ¾ positions would be used, respectively.

Negative motion vector components require slightly different selection. For example, the component −3¾ actually lays ¼ of the way between the two pixel positions and so requires selection of the ¼ position filter In the preferred embodiment three families of filter are used as follows:
Two-tap bi-linear filter (see Table V),
Four tap bi-cubic filter (alpha==−0.5) (see Table VI)
6-tap filter (see Table VII)

TABLE 5

Coefficients of the 2-tap Bi-linear Filter (Normalized to 128)

| Position/Tap | $t_0$ | $t_1$ |
|---|---|---|
| 0 | 128 | 0 |
| ⅛ | 112 | 16 |
| ¼ | 96 | 32 |
| ⅜ | 80 | 48 |
| ½ | 64 | 64 |
| ⅝ | 48 | 80 |
| ¾ | 32 | 96 |
| ⅞ | 16 | 112 |

TABLE 6

Coefficients of the 4-tap bi-cubic Filter alpha = −0.5 (Normalized to 128)

| Position/Tap | $t_1$ | $t_0$ | $t_1$ | $t_2$ |
|---|---|---|---|---|
| 0 | 0 | 128 | 0 | 0 |
| ⅛ | −6 | 123 | 12 | −1 |
| ¼ | −9 | 111 | 29 | −3 |
| ⅜ | −9 | 93 | 50 | −6 |
| ½ | −8 | 72 | 72 | −8 |
| ⅝ | −6 | 50 | 93 | −9 |
| ¾ | −3 | 29 | 111 | −9 |
| ⅞ | −1 | 12 | 123 | −6 |

TABLE 7

Coefficients of the 6-tap Filter (Normalized to 128)

| Position/Tap | $t_{-2}$ | $t_{-1}$ | $t_0$ | $t_1$ | $t_2$ | $t_3$ |
|---|---|---|---|---|---|---|
| 0 | 0 | 0 | 128 | 0 | 0 | 0 |
| 1/8 | 0 | −6 | 123 | 12 | −1 | 0 |
| 1/4 | 2 | −11 | 108 | 36 | −8 | 1 |
| 3/8 | 0 | −9 | 93 | 50 | −6 | 0 |
| 1/2 | 3 | −16 | 77 | 77 | −16 | 3 |
| 5/8 | 0 | −6 | 50 | 93 | −9 | 0 |
| 3/4 | 1 | −8 | 36 | 108 | −11 | 2 |
| 7/8 | 0 | −1 | 12 | 123 | −6 | 0 |

In the tables, each row specifies a set of filter taps for the generation of the specified $1/8^{th}$ pixel position. The taps are applied to a contiguous set of pixels in the appropriate direction, horizontal or vertical, such that the taps $t_0$ and $t_1$ are applied to the pixels closest to the fractional position being interpolated. All of the filters are normalized to 128 to permit integer only implementation. After the application of the filter the values are re-normalized and clipped back to the range 0 to 255.

The bi-linear filter is the simplest to implement but can produces result that appear blurred due to its narrow pass-band. This filter is used in areas of low variation to suppress noise and reduce any coding artifact that may be present.

The alpha=−0 5 bi-cubic filter is a reasonable compromise 4-tap filter. It produces sharper results than the bilinear filter without introducing ringing artifacts since it has sub-unit gain throughout the entire frequency spectrum.

The first two filters both exist as prior art and have been extensively used. The six-tap filter, however, forms part of the current invention. The filter taps were derived to produce the widest possible pass-band in the transfer function, whilst containing virtually no above unit gain throughout the frequency spectrum.

Figure 7:
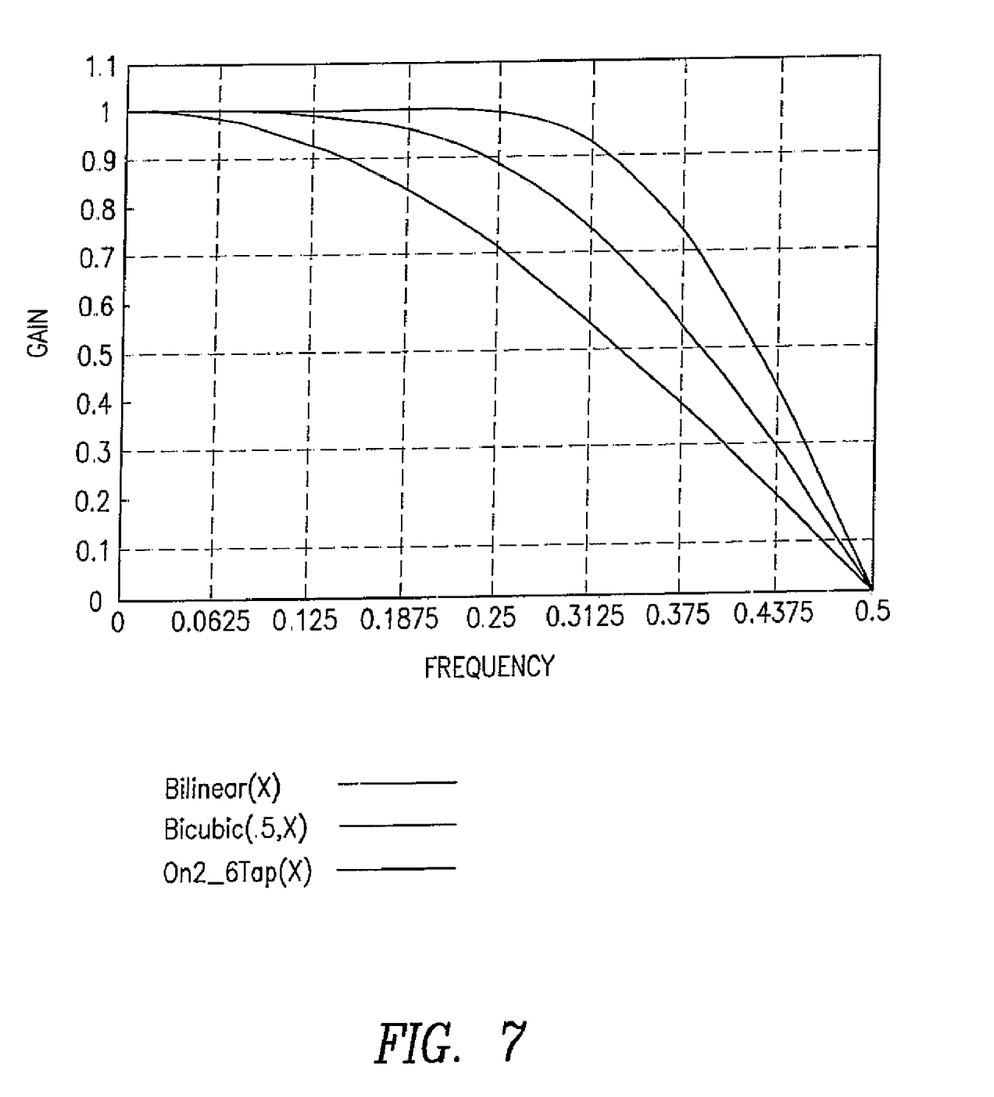
FIG. 7 is a graph depicting the transfer function of bi-linear, bi-cubic, and the inventive 6-tap filters as gain as a function of frequency.

FIG. 7 plots the transfer functions for all three-filter families at the 1/2 pixel position.

FIG. 7 Transfer Function of Bi-Linear, Bi-Cubic and On2 6-Tap Filters.

The selection of which filter family to use for a particular block is based on the content of the data being filtered. In a preferred embodiment, the magnitude of the sum of inter-pixel differences in the direction that the filter is to be applied is used to select between filter types as follows:

HDiff=Sum of differences between horizontally neighboring pixels in block;
VDiff=Sum of differences between vertically neighboring pixels in block;
  If (HDiff<$T_0$)
  HFilter=Bi-Linear Filter;
  Else if (HDiff<$T_1$)
  HFilter=Bi-Cubic Filter;
  Else if (HDiff<$T_2$)
  HFilter=6-tap Filter;
  If (VDiff<$T_0$)
  VFilter=Bi-Linear Filter;
  Else if (VDiff<$T_1$)
  VFilter=Bi-Cubic Filter;
  Else if (VDiff<$T_2$)
  VFilter=6-tap Filter;

Where the thresholds $T_0$, $T_1$, and $T_2$ may either be derived by the encoder and the values coded in the bitstream, or have fixed values known to both encoder and decoder Output from the filter is positioned at its center in the sense that, for a length N filter (where N is even), the first N/2 filter taps are multiplied by the N/2 pixels directly to the left of (or above) the position being interpolated, and the final N/2 taps multiplied by the N/2 pixels directly to the right of (or below) the position being interpolated. The final output value is the sum of these N products, appropriately rounded and normalized.

It should be noted that pixels outside of the block are used during the filtering process since the filter extends beyond the bounds of the block boundary at either end. To this end the reference frame must be padded beyond its boundary by repeating the value of the edge pixel as required.

The filtering process is summarized by the following pseudo-code. The pseudo-code makes the assumption that the filter is 6-tap. Smaller filters must be padded with zeros and have the coefficients centered, e.g. the two-tap and four-tap filters are specified as $\{0, 0, t_0, t_1, 0, 0\}$ and $\{0, t_{-1}, t_0, t_1, t_2, 0\}$, respectively:

```
#define FILTER_WEIGHT 128 //Sum of the filtertaps
#define FILTER_SHIFT 7 // Number of bits to shift output from
                     //filter by to effect normalization
void FilterBlock2d
(
    unsigned char *SrcPtr,      // Pointer to prediction block data
                                  in reference frame
    unsigned char *OutputPtr,   // Pointer to output block being
                                  interpolated
    int SrcPixelsPerLine,       // Number of pixels in input &
                                  output line
    short *HFilter,             // Pointer to array containing 6-tap
                                  Horizontal Filter
    short *VFilter              // Pointer to array containing 6-tap
                                  Vertical Filter
)
{
    int FData[9*4];             // Temp data buffer used in
                                  filtering
    // Note: SrcPtr points to the block of pixels in the prediction frame
    // that the non-fractional part of the motion vector indicates
    // Step 1: Filter block horizontally using specified filter:
    FilterBlockHorizontally ( SrcPtr-(2*SrcPixelsPerLine),
    SrcPixelsPerLine,
                                        FData, 9, 4, HFilter );
    // Step 2: Filter block vertically using specified filter:
    FilterBlockVertically ( FData+8, 4, OutputPtr, 4, 4, VFilter);
}
void FilterBlockHorizontally
(
    unsigned char *SrcPtr
    int SrcPixelsPerLine,
    int *OutputPtr
    int OutputHeight,
    int OutputWidth,
    int *Filter
)
{
    int i, j;
    int Temp;
    for ( i=0; i<OutputHeight; i++ )
    {
        for ( j=0; j<OutputWidth; j++ )
        {
            // Apply filter:
            Temp = ((int)SrcPtr[-2] * Filter[0]) +
                   ((int)SrcPtr[-1] * Filter[1]) +
                   ((int)SrcPtr[0] * Filter[2]) +
                   ((int)SrcPtr[1] * Filter[3]) +
                   ((int)SrcPtr[2] * Filter[4]) +
                   ((int)SrcPtr[3] * Filter[5]);
            // Add in the rounding value based on filter-tap sum:
            Temp +=(FILTER_WEIGHT >>1);
            // Normalize output to range 0-255:
            Temp = Temp >> FILTER_SHIFT;
            if( Temp < 0 )
                Temp = 0;
            else if ( Temp > 255 )
                Temp = 255;
```

-continued

```
        // Store output value:
        OutputPtr[j] = Temp;
        SrcPtr++;
    }
    // Move to start of next row:
    SrcPtr    += SrcPixelsPerLine – OutputWidth;
    OutputPtr += OutputWidth;
    }
}
void FilterBlockVertically
(
    int *SrcPtr
    int SrcPixelsPerLine,
    unsigned char *OutputPtr,
    int OutputHeight,
    int OutputWidth,
    int *Filter
)
{
    int i, j;
    int Temp;
    for ( i=0; i<OutputHeight; i++ )
    {
        for ( j=0; j<OutputWidth; j++ )
        (
            // Apply filter:
            Temp =       ((int)SrcPtr[ –2*SrcPixelsPerLine] * Filter
            [0]) +
                        ((int)SrcPtr[ –1*SrcPixelsPerLine] * Filter[1]) +
                        ((int)SrcPtr[ 0*SrcPixelsPerLine] * Filter[2]) +
                        ((int)SrcPtr[ 1*SrcPixelsPerLine] * Filter[3]) +
                        ((int)SrcPtr[ 2*SrcPixelsperLine] * Filter[4]) +
                        ((int)SrcPtr[ 3*SrcPixelsPerLine] * Filter[5]);
            // Add in the rounding value based on filter-tap sum:
            Temp += (FILTER_WEIGHT >>1 );
            // Normalize output to range 0-255:
            Temp = Temp >> FILTER_SHIFT;
            if( Temp < 0 )
                Temp = 0;
            else if ( Temp > 255 )
                Temp = 255;
            // Store output value:
            OutputPtr[j] = (unsigned char)Temp;
            SrcPtr++;
        }
        // Move to start of next row:
        SrcPtr        +=SrcPixelsPerLine – OutputWidth;
        OutputPtr     +=OutputWidth;
    }
}
```

Having described the invention, it is to be understood that the invention is defined not by the above description but by the claims appearing herein below. Various modifications that may be made by one of ordinary skill in the art are considered to be within the scope of the invention.

What is claimed is:

1. A method for intra prediction for use in block based video compression/decompression algorithms comprising the steps of:

using an encoder to subdivide each image into a set of partitions;

using an encoder to provisionally encode each partition using a plurality of different prediction modes in which pixels in the current partition are predicted by previously decoded pixels within the same image from the row above and the column to the left of the current partition, said provisional encoding done by giving each pixel in the partition a predicted value using one of a plurality of equations, wherein at least one of said plurality of equations comprises the following equation:

$$X_{ij}=L_i+A_j-C;$$

wherein i and j represent a row and column position of $X_{ij}$ within a partition, whereby there is a row of pixels above and a column of pixels to the left of said partition, $L_i$ is a pixel from said column to the left of said partition in a same row of $X_{ij}$, $A_j$ is a pixel from said row above said partition in a same column as of $X_{ij}$, C is a pixel on the intersection of the row above and column left to the partition;

using an encoder to select and encode the optimal mode for each partition using a conditional probability distribution and;

using an encoder to transmit the selected optimal mode within a bitstream.

2. The method of claim 1, wherein the conditional probability distribution is defined by a table of constants.

3. The method of claim 1, further comprising the step of updating the probability distribution on a per frame basis according to statistics gathered relating to the frequencies or conditional frequencies of each mode in at least one prior frame.

4. The method of claim 1, wherein the probability distribution is a fixed baseline distribution.

5. The method of claim 1, wherein the probability distribution is updated for an image only when the number of bits used to update the probability distribution plus the number of bits required to encode all the prediction modes within the image using the updated probability distribution is less than the number of bits required to encode all the prediction modes using either the baseline probability distribution or the unchanged probability distribution from the previous frame.

6. The method of claim 1, wherein selecting the optimal mode for a partition is based on a metric that combines the cost of the modes with error scores of the modes, where the cost of an intra prediction mode of a partition is calculated using Shannon cost of each mode calculated by the conditional probability distribution of the intra prediction modes for the partition and the error score of the mode is calculated using the differences between the predicted pixels values and the actual pixel values for the partition.

7. The method of claim 3, further comprising the steps of:
Multiplying the cost of each mode with a constant;
Adding the multiplied cost of each mode to the error score for the mode; and
Selecting the intra prediction mode with lowest combined score for the partition.

* * * * *